United States Patent [19]

Lowther

[11] 4,283,291
[45] Aug. 11, 1981

[54] CORONA REACTION METHOD AND APPARATUS

[75] Inventor: Frank E. Lowther, Severna Park, Md.

[73] Assignee: Union Carbide Corporation, New York, N.Y.

[21] Appl. No.: 49,554

[22] Filed: Jun. 18, 1979

Related U.S. Application Data

[60] Continuation of Ser. No. 762,053, Jan. 24, 1977, abandoned, which is a division of Ser. No. 632,580, Nov. 17, 1975, Pat. No. 4,038,165, which is a continuation-in-part of Ser. No. 558,046, Mar. 13, 1975, Pat. No. 4,016,060.

[51] Int. Cl.$^3$ .............................................. C01B 13/11
[52] U.S. Cl. ..................................... 250/536; 250/535
[58] Field of Search ............... 250/532, 535, 534, 539, 250/540, 536; 204/176; 423/581

[56] References Cited

U.S. PATENT DOCUMENTS

| 3,551,738 | 12/1970 | Young | 315/244 |
|---|---|---|---|
| 3,766,051 | 10/1973 | Bollyky | 250/539 |
| 3,784,838 | 1/1974 | Lowther | 250/536 |
| 3,800,210 | 3/1974 | Caussin | 250/535 |
| 3,898,468 | 8/1975 | Guerin | 250/535 |
| 3,919,064 | 11/1975 | Lowther | 204/176 |

OTHER PUBLICATIONS

Yates et al., "Chemical Reactions in a Silent Electric Discharge" *Chemtech*, Jan. 1973, pp. 31-35.

*Primary Examiner*—Deborah L. Kyle
*Attorney, Agent, or Firm*—Eugene Lieberstein

[57] ABSTRACT

Corona induced chemical reactions are conducted in a corona discharge zone in which narrow high voltage pulses are applied along with a relatively low voltage bias potential. It is found that for many corona discharge reactions, such as the conversion of oxygen to ozone, the present method increases the electrical efficiency of the reaction.

5 Claims, 7 Drawing Figures

CORONA REACTION METHOD AND APPARATUS

This application is a continuation of application Ser. No. 762,053, filed Jan. 24, 1977, now abandoned, which is a division of application Ser. No. 632,580, filed Nov. 17, 1975, now U.S. Pat. No. 4,038,165, which is a continuation-in-part of application Ser. No. 558,046, filed Mar. 13, 1975, now U.S. Pat. No. 4,016,060.

The present invention relates to corona reaction systems, and more particularly to method and apparatus which may be used to increase the electrical efficiency of corona induced chemical reactions.

It is well known that many chemical reactions, such as the conversion of oxygen to ozone, may be effectively conducted in the presence of an electrical corona discharge. While it is found that high voltage corona is in many instances a convenient means by which to induce chemical reactions, corona discharge processes are extremely inefficient in terms of electrical energy required per unit of desired reaction product produced. For example, in the case of ozone produced from oxygen, the theoretical energy required to produce a Kg of ozone is 0.97 KWH per Kg while in practice it is found that about 6.6 KWH per Kg are needed with oxygen feed and 17.0 KWH/Kg with dry air feed.

Prior workers have attempted to decrease the amount of energy required to produce a corona reaction by varying many of the operational parameters of the corona generation system. For example, it is known that the use of pulsed high voltage energy having a pulse duration of 1 microsecond and a frequency as high as 1 $Kh_z$ will more efficiently decompose carbon dioxide than a conventional 60 Hz AC waveform. However, it has also been shown that the use of an extremely high frequency corona power in the radiofrequency range, that is, 1–20 $MH_z$, does not result in increased efficiency in the production of ozone.

While the prior art suggests that changes in efficiency may be obtained in corona induced chemical reactions by the manipulation of frequency and waveform, it has been found that these attempts have resulted in processes that show no improvement and are in fact impractical from the commercial standpoint. This is primarily due to the fact that the use of high frequencies and voltages result in the production of excess heat which is unmanageable when large scale operation and high unit capacities which require high power densities per unit of electrode surface are contemplated.

It is therefore an object of the present invention to provide an improved corona discharge system.

It is a further object to provide a method by which the overall electrical energy required to produce a corona discharge chemical reaction may be minimized.

It is still a further object to provide a means by which the amount of excess heat which results from a corona discharge reaction process is substantially decreased.

It is yet another object to provide a method by which the operation and equipment parameters involved in a corona discharge chemical reaction system may be optimized to produce maximum product and minimum waste heat.

It is still a further object to provide an improved corona generator system which will make feasible corona reaction processes which are conducted at high unit capacities and maximum electrical efficiencies.

It is still another object to provide an improved ozone generation system which is capable of efficiently producing ozone in large quantities from an oxygen containing reactant gas, such as air, which contains considerable quantities of moisture and other impurities.

It is still a further object to provide economical, reliable, high voltage, high frequency narrow pulse power supplies which are capable of driving large size corona generators to produce commercial quantities of ozone.

It is still yet another object to provide a system by which ozone may be safely generated in concentrations of 10% by weight without undue decomposition of ozone.

These and still further objects of the present invention will become readily apparent to one skilled in the art from the following detailed description and drawings wherein.

Figure 6:
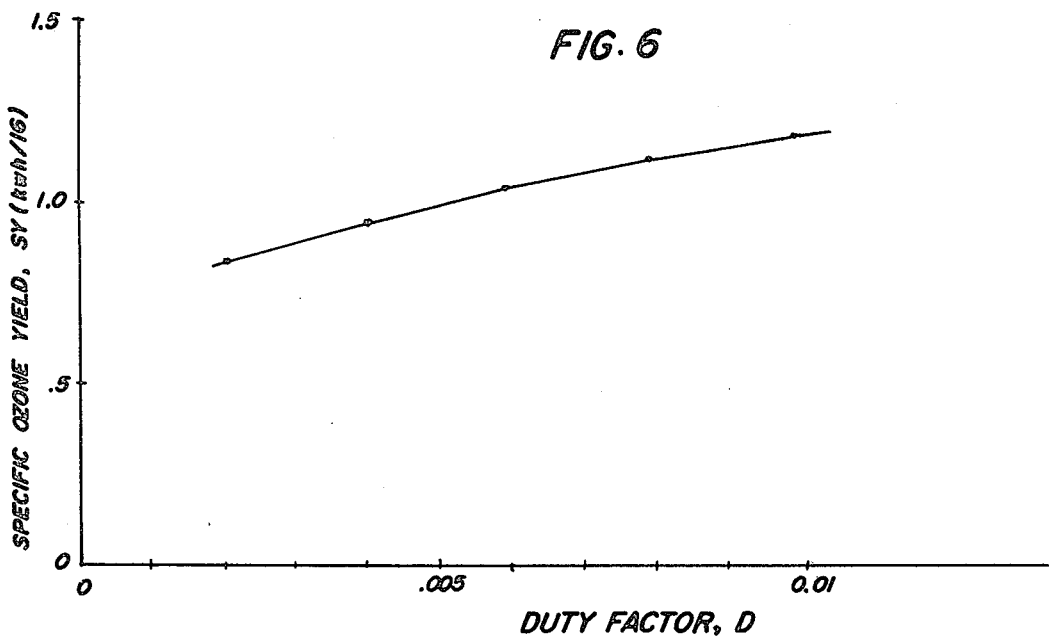
Figure 7:
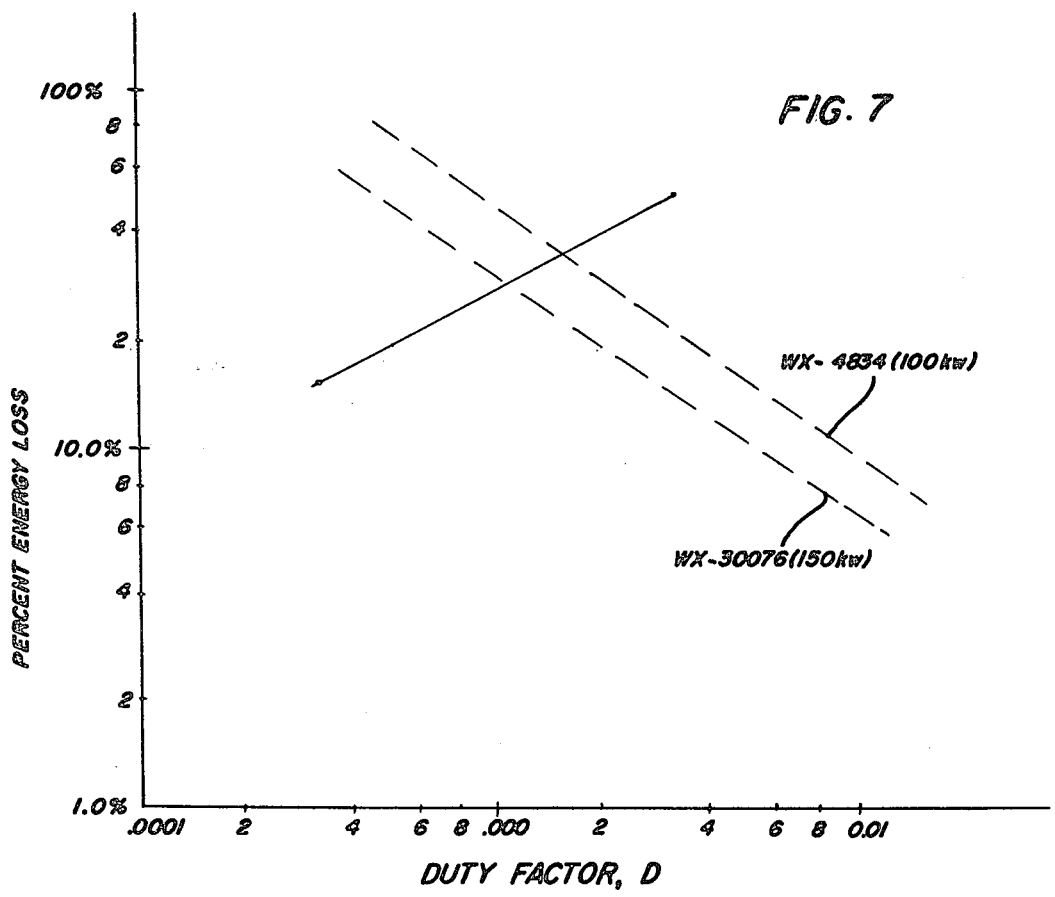

FIG. 6 is a plot in which specific ozone yield is plotted on the vertical scale versus duty factor on the horizontal scale, which may be used to select certain preferred operational parameters of the present system; and FIG. 7 is a plot in which percent energy loss is plotted on the vertical scale versus duty factor on the horizontal scale, which may be used to select certain preferred operational parameters used in the practice of the present invention.

Broadly, my invention comprises a method for increasing the electrical efficiency of a corona discharge reaction system, and correspondingly substantially reducing the amount of waste heat produced thereby, wherein a narrow pulse high voltage waveform is applied along with a relatively low voltage bias potential.

More specifically, I have invented a corona reaction system wherein the corona is produced in a gas filled gap between opposing electrodes by a high voltage, narrow pulse electrical discharge in which the electrical pulse width is less than the gas ion transit time between the electrodes, and wherein a low voltage bias potential is maintained between the electrodes which is sufficient to substantially remove gas ions from the gap in the time interval between pulses.

In most conventional corona discharge systems the high voltage electrical potential is applied across the discharge gap in the form of relatively wide electrical pulses. Typically, the electrical energy waveform is a conventional sine wave, while in other instances pulse energy having a pulse duration of 1 to 200 microseconds ($\mu$sec) have been utilized.

It is observed that these prior art systems are extremely inefficient and that 90 to 99% of the electrical energy is wasted in the form of excess heat. I have determined that the excess heat generated in these conventional systems may be attributed to the kinetic energy which is imparted to the charged gas molecules (ions) which are present in the corona discharge gap. The electrons which are responsible for the formation of the desired reaction product are formed and accelerated to reaction potential during the initial part of the conventional electrical power pulse. The remainder of the pulse supplies kinetic energy to the charged gas molecules which result from the formation of electrons and which do not contribute to the formation of reaction product. These ionized gas molecules dissipate their kinetic energy in nonproductive collision which appears as waste heat in the reaction system.

In my process I have substantially reduced the amount of waste heat by modifying the applied electrical waveform in two ways:

(1) The duration of the electrical power pulse ($T_w$) is selected to be substantially less than the gas ion transit time across the discharge gap ($T+$).

(2) A relatively low voltage bias potential ($V_b$) is maintained between the discharge electrodes to remove the majority of the charged gas molecules.

By selecting an extremely narrow energy pulse at the required sparking potential to produce ozone ($V_s$) it is found that the electrons which are formed are accelerated to an energy level required to do useful work. However, the energy pulse is not of sufficient duration to impart any significant waste energy to the charged gas molecules which are correspondingly formed.

It is recognized, however, that the gas ions which are present in the discharge gap must be removed before the next applied energy pulse, or a substantial portion of the energy pulse will be wasted in further acceleration of the non-productive gas ions. To achieve removal of gas ion "debris", I apply a relatively low voltage bias potential or "debris ion sweeping" potential during the interval between high energy electrical pulses. This low voltage bias potential is applied for a period which is substantially greater than the high energy pulse. However, since the energy applied to a charged particle in an electrical field is a function of only the particle charge and the field potential, the energy required to sweep the ion debris from the discharge gap is relatively minor.

The relationship which defines the preferred low voltage bias potential $V_b$ is as follows:

$$T_r V_b = T+ V_s$$
$$V_b = \frac{T+}{T_r} V_s$$

wherein $T_r$ represents the pulse repetition period, $T+$ is the calculated gas ion transit time to sweep substantially all the gas ions from the gap at the sparking (corona discharge) potential $V_s$.

In order to determine the actual pulse width and frequency which is employed in the production of the high frequency narrow pulse energy it is necessary to select a pulse width which is substantially less than the pulse repetition period (which is the reciprocal of the frequency). In general, the actual pulse width $T_w$ is selected so as to be a small percentage of the overall pulse repetition rate $T_r$. In general it is found that in most applications the $T_w$ will be from about 0.1 to 10 percent of $T_r$. Furthermore, it is noted that in order to produce the desired chemical reaction the pulse width should be of sufficient duration and magnitude to impart sufficient kinetic energy to electrons which produce the desired chemical reaction. Therefore, the desired narrow pulse width $T_w$ will be somewhat greater than the pulse width required to accelerate the electrons across the discharge gap, this time being referred to as $T_e$.

In order to implement my novel method and to optimize the design of the equipment and electrical circuits which are utilized herein, it is found that the operational and circuit parameters of the system may be conveniently selected in accordance with the following consideration of a circuit which employs a conventional heated cathode vacuum switch tube type power supply.

For most heated filament vacuum tube switch devices it is well known that the optimum electrical efficiencies are obtained when a duty cycle (D) is selected which is as high as possible. That is a relationship $$D = T_w/T_r$$

is maximized commensurate with the energy losses which result in corona generation due to a pulse width $T_w$ which is necessarily larger than the electron transit time $T_e$ and substantially less than the gas ion transit time $T+$.

To optimize the parameters of duty cycle D and pulse width $T_w$, pulse repetition time $T_r$ which is the reciprocal of the pulse frequency f, I have found the following relationship exists:

$$\alpha 2 = D \quad (1)$$

wherein:

$$\alpha = T_w/T+ \quad (2)$$

and $T+$ is the gas ion transit time which may be readily calculated for any gas ion using the well known principles typically set forth in "Gaseous Conductors" by J. D. Cobine, Dover Publications, N.Y. (1958).

Equation (1) may be rewritten $$D = \left(\frac{T_w}{T+}\right)^2 \quad (3)$$

For air it is found by using the relationships provided by Cobine, that $$T+ = \frac{(1)}{K_p} \frac{t_g}{40} \quad (4)$$

The product $K_p$ is constant for any gas. For air $$K_p = 1064 \frac{(cm/sec)}{volt/cm} (m.m.Hg) \quad (5)$$

A reasonable approximation of $T+$ is $$T+ = 1.83 \times 10^{-5} t_g \quad (6)$$

Accordingly, to give an example of how the operational parameters may be optimized for a corona discharge system which is operating on air to produce ozone at a pressure (p) of 1520 m.m.Hg absolute with a discharge gap of 0.115 cm. the following calculations are made, using equation (6) above $$T+ = 2.10 \, \mu sec.$$

The sparking voltage Vs or gap potential required to produce corona is calculated from the following relationship, which appears in Cobine:

$$V_s = 40\, p\, tg$$
$$= 40 \times 1520 \times 0.115 = 6992 \text{ volts}$$

The pulse width Tw is determined using equation (2) above $$Tw = \alpha T+$$

wherein $\alpha$ is less than 1. Furthermore, Tw is selected to be somewhat greater than the electron transit time Te across the discharge gap which may be readily calculated by comparing the masses of the electron with the mass of the gas ion (oxygen) used in the calculation of the gas ion transit time T+. This calculation is as follows:

$$Te = \frac{T+}{\sqrt{1840 \times 16}}$$
$$= 0.012\, \mu\text{sec}$$

It can be shown that the amount of power consumed in the production of ozone, that is, specific ozone yield, Sy, which is due to pulse width losses and pulse bias losses is approximately $$Sy = 0.6\,(.1 + \alpha)\left(1 + \frac{D}{\alpha}\right)$$

and is a minimum when $$\alpha = \sqrt{D}$$

Accordingly $$Sy\,(\min) = 0.6\,(1 + 4\sqrt{D})^2$$
$$= 0.6\,(1 + 4\alpha)^2$$

and if Sy in KWH per pound of ozone produced is plotted against D, the duty factor, a curve such as is shown in FIG. 6 results. From FIG. 6 it is seen that D should be as low as possible to obtain the lowest ozone specific yield Sy in terms of KWH/lbs. $O_3$ produced as far as the pulse geometry is concerned.

To select a specific value for the duty cycle D when using a typical heated cathode vacuum tube power supply circuit wherein the vacuum tube filament loss is of primary consideration, a plot such as is shown in FIG. 7 is prepared. In FIG. 7 the duty factor D is plotted as a solid line against the percent energy loss which is attributed to pulse geometry (which may be readily determined from FIG. 6). Also plotted are a series of broken lines in FIG. 7 which represent the percent energy loss due to filament heating in two typical vacuum tube switch devices rated at 100 and 150 KW respectively. It is seen from FIG. 7 that the preferred duty cycle D for the 150 KW tube is about 0.001 and it is at approximately that point where the tube filament loss is equal to the pulse geometry, that is, process, loss.

When the duty cycle D has been chosen to be 0.001 $\alpha$ is calculated as follows:

$$\alpha = \sqrt{D}$$
$$= \sqrt{0.001}$$
$$= 0.0317$$

From $\alpha$ and T+ the desired pulse width Tw and frequency F may be calculated as follows:

$$Tw = T+$$
$$= 0.0317 \times 2.09 = 0.066\, \mu\text{sec.}$$

and $$f = \frac{1}{Tr} = \frac{D}{T_w}$$
$$= \frac{0.001}{0.066} = 15100 \text{ Hz}$$

To determine the preferred low voltage bias potential Vb which is used to remove positively charged gas molecules from the discharge gap between pulses, the following relationship is used:

$$Vb = \frac{T+}{Tr}\, Vs \text{ and } Tr = \frac{1}{f} = \frac{1}{15100}$$
$$Vb = \frac{2.09}{15100} \times 6975$$
$$= 315 \text{ V.}$$

In accordance with the above calculations, it is seen that the preferred operational parameters may be summarized as follows:

$$D = 0.001$$
$$Vs = 6975 \text{ v}$$
$$f = 15100 \text{ Hz}$$
$$Vb = 315 \text{ v}$$

Figure 1:
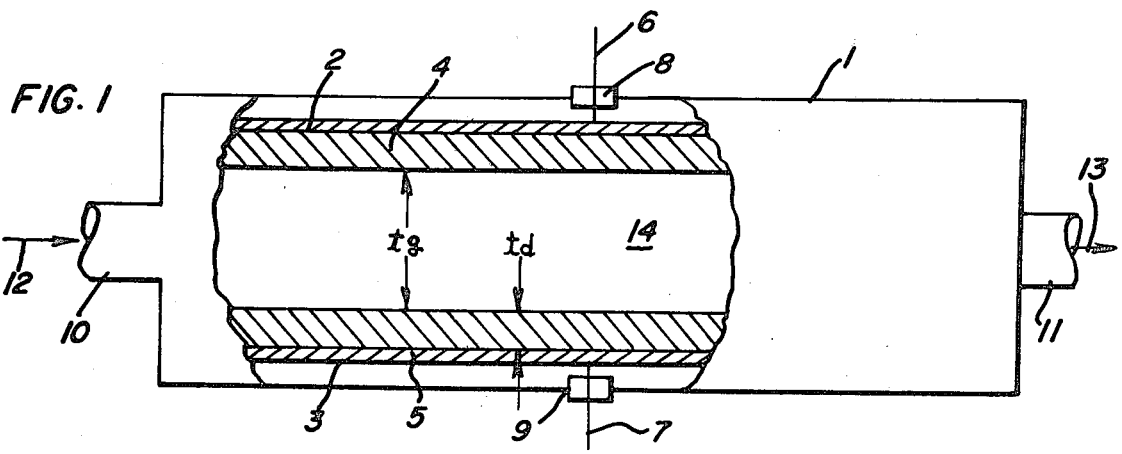
FIG. 1 represents a cross-sectional view with parts broken away of a typical corona discharge cell which may be used in the practice of the present invention.

A more clear understanding of the present invention may be obtained by reference to the drawings in which FIG. 1 is a cross-sectional view of a corona cell with parts broken away which may be used in the corona reactions systems contemplated herein. The corona reaction cell of FIG. 1 includes a gas tight housing 1 in which are placed two opposing electrodes 2 and 3. Between electrodes 2 and 3 are placed dielectric plates 4 and 5, the inner surfaces of which define a corona discharge gap having a thickness tg, as indicated in FIG. 1. The dielectric plates 4 and 5 possess a thickness td, the actual dimension of which is enlarged considerably for purposes of clarity. Likewise, the dimension tg is considerably expanded in the drawing for purposes of clarity. Typically, the dielectric thickness, td, may range as small as 0.1 mm and in certain instances may be as large as 24 to 50 mm. The discharge gap tg may range from about 0.1 to 50 mm.

The electrode plates 2 and 3 are connected to an external power source through conductors 6 and 7 respectively, which enter the housing 1 through insulated bushings 7 and 8. While in the present drawing it is shown that the electrodes 2 and 3 are not in contact with the housing 1, it is found that in actual practice if the housing 1 is constructed of essentially electrically non-conducting material, the electrode plates may be in contact therewith. Furthermore, it is found in actual practice that either of the electrodes 2 or 3 may be grounded, and in the event the housing is constructed of conductive material, may support either of the electrodes.

As shown in FIG. 1, reactant gas enters the housing 1 through conduit 10 and the reactant product exits through conduit 11. The arrow 12 indicates direction of flow into the housing 1, while arrow 13 indicates the direction of the existing reaction products. Furthermore, in FIG. 1, 14 indicates the corona discharge zone which is defined between the electrodes 2 and 3 and the dielectric plates 4 and 5. While the present drawing shows the use of two dielectric plates, each of which is essentially in contact with the opposing electrodes 2 and 3, it should be understood that devices wherein the electrode plates are spaced from the electrodes, or wherein a single dielectric plate is located between, may also be utilized. In practice it is found that satisfactory results may be obtained when the dielectrics are constructed of materials having good dielectric qualities, that is dielectric strength of from about 100,000 to 1,000,000 volts per cm, such as glass. It is also found that extremely thin dielectric layers formed from fired on porcelain enamel coatings having a thickness of from about 0.1 to 0.5 mm produces particularly satisfactory results.

Figure 2:
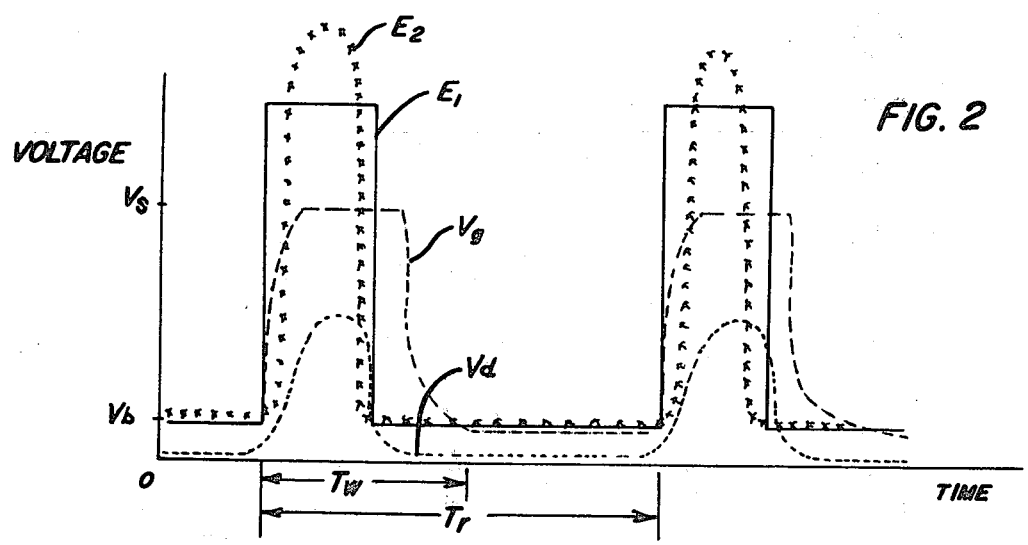
FIG. 2 is a graphic representation wherein supplied, applied, dielectric and gap voltages are plotted on the vertical axis versus time on the horizontal axis, and represents the preferred waveform of the electrical energy pulses used to generate corona discharge.

FIG. 2 shows in graphic idealized form the shape of the desired narrow electrical power pulses which are used in the practice of the present invention. It is noted that in FIG. 2 that 4 curves are plotted with voltage on the vertical axis and time on the horizontal axis. The curve $E_1$ (set forth as a solid line) represents the voltage of the preferred square wave pulse which is initially produced most efficiently by the high speed switch device of a suitable power supply. The curve $E_2$ (shown as a series of X's) represents the voltage of the initial power pulse $E_1$ after passing through a suitable inductance which has a value selected to minimize the power loss which normally results from the charging of a resistance-capacitance circuit. $E_2$ is the power pulse which is applied to the electrodes of the corona cell shown in FIG. 1. The curve Vg (dashed line) represents the voltage which appears across the discharge gap 14 of the corona cell and has a maximum value of Vs which is the sparking or ionization potential of the gap. Vg has a lower value of Vb which is the bias potential, a pulse width of Tw and a repetition period of Tr. The curve indicated as Vd (dotted line) is the value of the potential which appears across the dielectrics of the corona cell. As will be discussed herein an understanding of the various preferred voltage wave forms which appear at various points in the corona cell will provide a basis by which one skilled in the art may design a circuit suitable for practice of the present invention.

While the preferred waveform shown in FIG. 2 indicates the pulses to be monopolar, it is to be understood that bipolar pulses in which each succeeding pulse is of alternating polarity may also be utilized. It is to be also understood that while FIG. 2 shows the bias potential to be greater than 0, that is, a + bias potential, it is found that Vb may also be utilized in the form of a negative bias potential, that is, a value less than 0. Furthermore, it is shown that Vb is essentially constant in the waveform shown in FIG. 2. It should be understood that Vb may be either increasing or decreasing between power pulses, that is, Vb does not necessarily have to remain constant, and in fact may alternate to some extent.

The waveform shown in FIG. 2 may be produced by a variety of well known high voltage power supplies which utilize high speed switch devices such as solid state transistors, silicon controlled rectifiers, varactors, vacuum tubes of both the heated filament and non-filament types, such as thyratrons and ignitrons, as well as high speed mechanical switches.

Figure 5:
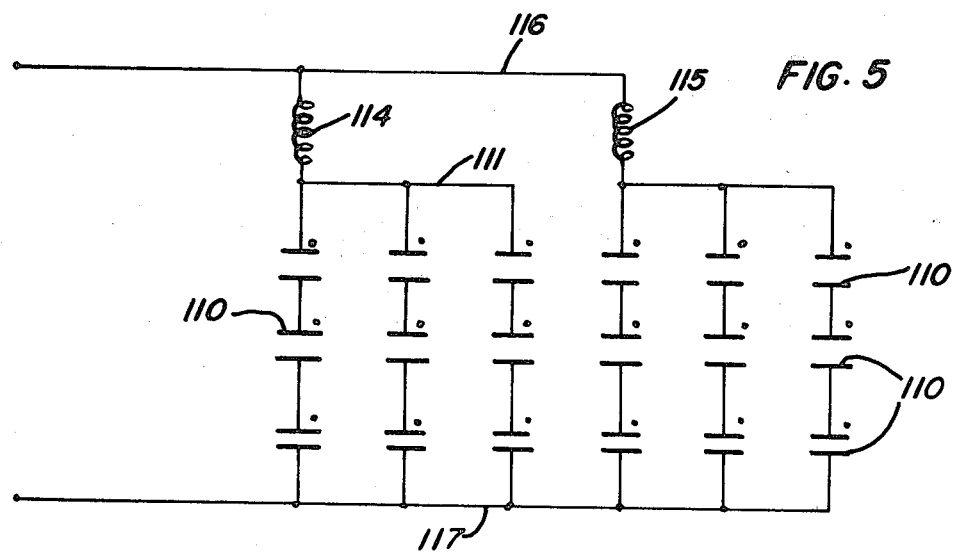
FIG. 5 is a schematic electrical circuit diagram which depicts a preferred series-parallel connection of a plurality of corona cells.
Figure 4:
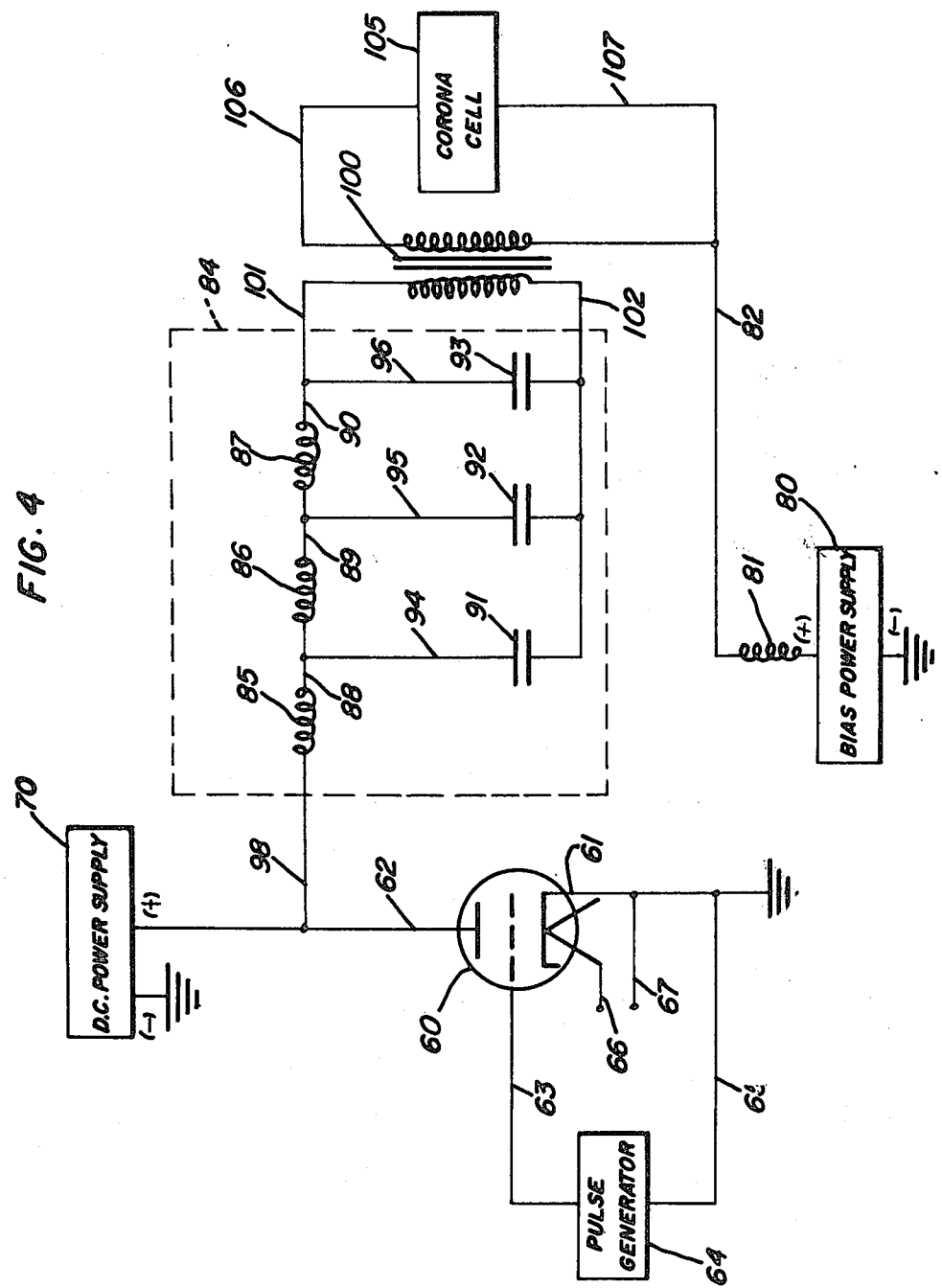

In FIGS. 4 and 5 two typical circuits are disclosed which use heated cathode vacuum switch tubes. it is to be understood, however, that the use of non-filament switch devices such as thyratrons and ignitrons have substantially no standby power losses and use thereof enables the operation of a more efficient process.

Figure 3:
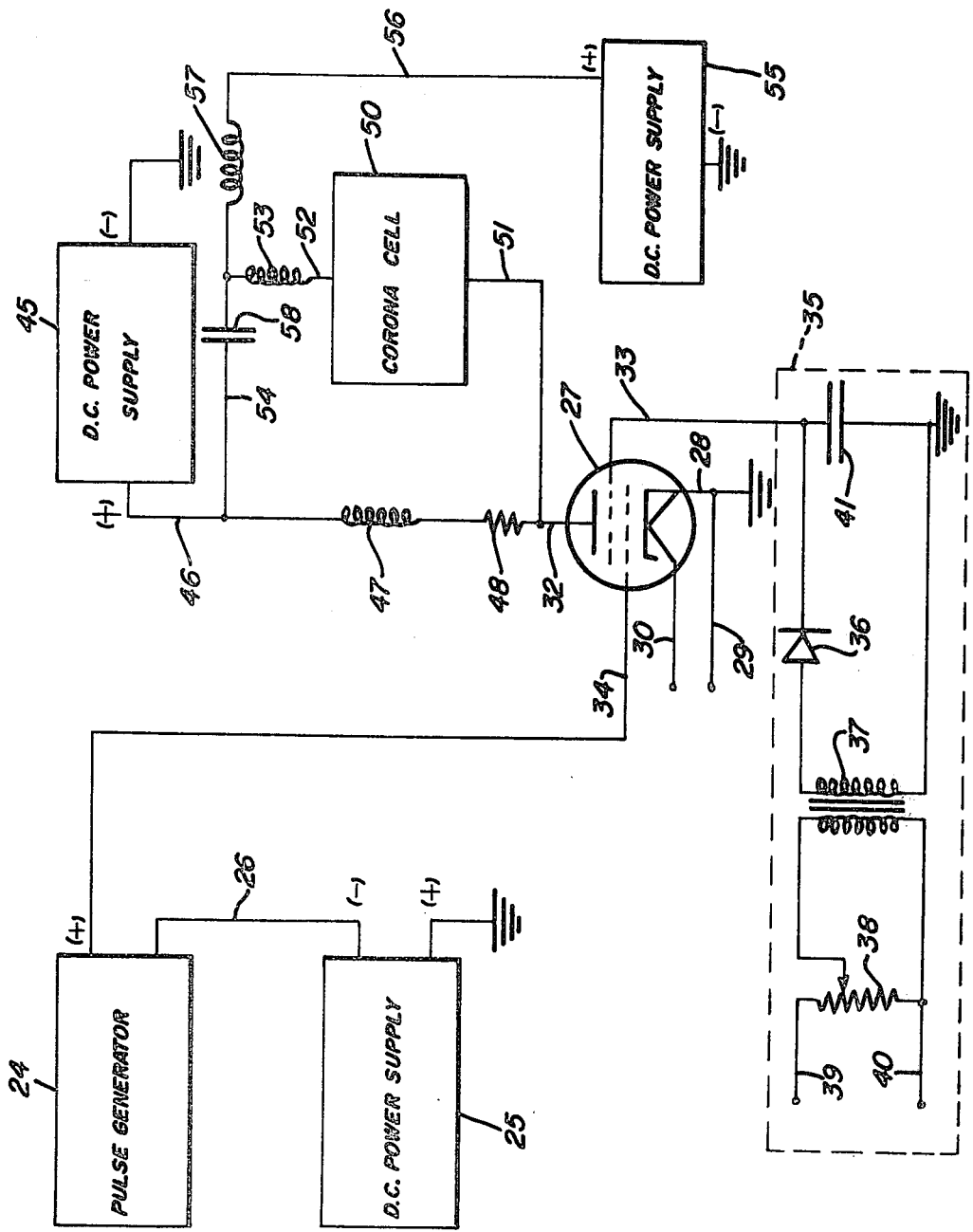
FIGS. 3 and 4 are circuit diagrams of preferred power supplies which may be used to obtain the desired corona discharge.

Reference to FIG. 3 reveals a corona generation system which includes a power supply of the typical vacuum tube amplifier type. In FIG. 3 a pulse generator 24 is connected to a DC power supply by means of electrical conduit 26. Pulse generator 24 is typically a commercial pulse generator unit such as is sold by Cober Electronics Inc., which is capable of producing pulse frequencies of a voltage up to 3000 volts at frequencies ranging from 1 Hz to 3 MHZ. The pulse generator 24 typically comprises a trigger circuit in combination with suitable vacuum tube amplifier stages. The DC power supply 25 is also commercially available and typically produces from about 0 to +3000 volts DC at a power level of up to 10 kw.

Pulse generator 24 is used to control the output of vacuum switch tube 27. Vacuum switch tube 27 is a typical heated cathode tetrode device which is readily commercially available. Tube 27 includes a heated cathode 28 which is connected to a source of power by leads 29 or 30. Typically the heating power means, not shown, range from about 4 to 40 volts. The vacuum tube 27 is provided with a plate lead 32, a secondary grid lead 33 and a primary grid lead 34. The secondary grid 33 is connected to a source of bias potential which is confined within broken line 35. The bias potential supply comprises a diode 36 which is connected to a power transformer 37 which in turn is supplied through a variable resistance 38 by means of power leads 39 and 40 which are connected to a convenient 60 cycle AC source, not shown. The bias potential means 35 also includes a capacitance 41 which serves to even out the output thereof.

The switching grid 34 of the vacuum tube 27 is connected to the pulse generator 24. The plate lead 32 is connected to a DC power supply 45 through a conductor 46 which is connected to an inductance coil 47 in series with a resistance 48. The DC power supply 45 is also connected through conductor 46 and conductor 54 in series with inductance coil 53 and conductor 52 to a corona cell 50. The coil 53 "spreads out" the square generated waveform such to minimize the energy loss normally associated with charging up a capacitor (cell capacitance in this case) through a charging resistor. In general, the value of the preferred inductance of the coil 53 is obtained by the readily recognized relationship $$L = \frac{Tw^2}{\pi C^2}$$

A power supply 55 may be used to supply a bias potential to the plates of corona cell 50 through conductor 56 and inductance 57 which connect through inductance 53 and conductor 52. The capacitance 58 serves to isolate a DC bias voltage from the remainder of the power supply circuit. In the event the bias potential is supplied through the switch tube 27, the power supply gas flow proceeds in series wise therethrough. Therefore, it is contemplated that in the system of FIG. 5 the produced were determined and summarized in the table set forth below.

| Run No. | Gas | Gas Flow (liter/min) | Freq. (Hz) | Tw ($\mu$s) | Vs (volts) | Vb (volts) | Specific yield of KWH/kg $O_3$ |
|---|---|---|---|---|---|---|---|
| 1 | Dry $O_2$ | 325 | 10,000 | 0.8 | 6000 | 500 | 2.2 |
| 2 | Dry $O_2$ | 325 | 5,000 | 0.8 | 6000 | 200 | 1.9 |
| 3 | Dry $O_2$ | 325 | 10,000 | 1.0 | 6000 | 600 | 2.4 |
| 4 | Dry Air | 325 | 10,000 | 0.8 | 6000 | 500 | 3.1 |
| 5 | Wet Air (+10° C. DP) | 325 | 10,000 | 0.8 | 6000 | 500 | 3.1 | reactant output of any given corona cell 110 may be series connected to the next and may include an intercooling heat exchange means which cools the reactant gas going from one corona cell to the other. It is also contemplated that in the system shown herein, intercooling of the output of one corona cell to the next may be conveniently eliminated due to the fact that the waste heat produced by the novel narrow pulse energy sources is minimized; therefore, intercooling may not be required except for every third, fourth or fifth series connected branch.

In the above I have outlined the basic aspects of the present invention. The following examples are given to illustrate the specific embodiments thereof.

EXAMPLE I

An ozone generating system was constructed which utilized the power supply circuit and arrangement generally set forth in FIG. 3. The pulse generator was a commercial Cober, Model 606, and the DC power supply, 25, was capable of producing 2000 volts DC at 1.0 amps. The DC power supply 45 had a capacity of 75,000 volts at 0.5 amps. The vacuum switch tube 27 was a 4 PR 100 A tetrode manufactured by Varian. The cathode heater leads 29 and 30 were connected to a source of 6.3 volts. The bias potential circuit 37 was regulated to produce a bias potential of +1600 volts. The inductance 47 had a value of 3 microhenry, whereas the resistance 48 was $2 \times 10^6$ ohms. The inductance 53 was 0.2 Henry.

The corona cell 50 comprised 3 cells connected in electrical series, each of which had an electrode surface area of 968 cm$^2$, a dielectric thickness of 0.44 mm, a gap dimension of 1.12 mm, wherein the dielectric comprised a fired-on porcelain enamel material. The corona cell was connected to a supply of air maintained at a pressure of 0.67 atmospheres (gauge) whereby a flow rate of 325 liters per minute through the corona cells was maintained. The pulse generator was operated at a frequency of 10,000 Hz with an output of +600 volts DC. The DC power supply 25 was operated at −500 volts DC, whereas the power supply 45 was operated at 30,000 volts. This produced a pulsed square power wave having the general shape shown in FIG. 2 wherein Vs was 6000, Vb was 200, Tw was 0.8 $\mu$S and Tr was 100 $\mu$S.

The device was operated under the above noted conditions wherein it was found that 450 grams of ozone per hour were produced. The overall power consumption amounted to 2.2 kilowatt hours per kg of ozone.

EXAMPLE II

The device described in Example I was operated under varying parameters, including feed gas, frequency, pulse width, bias potential and sparking voltage. A series of runs were made and the ozone produced and the power consumption required per gram of ozone The above examples and description clearly indicate a method by which the overall electrical efficiency of a corona generation system may be improved. While it is noted that the above example is directed to the production of ozone, it is found that numerous other chemical reactions, such as $N_2O_5$, $H_2O_2$ and $NH_3$ may be conducted with equivalent increase in efficiencies.

I claim:

1. A corona discharge generator system for multiple corona cells with each cell having a discharge gap comprising:
    power supply means for generating a DC output voltage of substantial magnitude in a range of between 5000 to 30,000 volts DC;
    means for converting said high DC output voltage into a series of narrow DC pulses at a pulse rate of between 0.1 to 100 KHz with each of said DC pulses having a predetermined maximum pulse width of less than about the gas ion transit time across the discharge gap of any of the corona cells;
    means for superimposing a bias potential upon said series of narrow DC pulses;
    at least one bank of corona cells having at least two parallel branches with each branch having at least two series connected corona cells with the number of parallel branches and number of series cells selected to establish a predetermined capacitance for said bank to control said predetermined pulse width;
    means for coupling said narrow pulses to said bank of corona cells, said coupling means including an inductive impedance in series circuit relationship with said bank of corona cells and having a magnitude in a range of between 1–100 microhenry.

2. A corona discharge generator as defined in claim 1 wherein said inductive impedance is limited to a value established in accordance with the following relationship:

$$L = \frac{Tw^2}{\pi C^2},$$

where L is the coil inductance, Tw is the pulse width and C is the corona cell capacitance.

3. A corona discharge generator system as defined in claim 2 comprising: a plurality of banks of corona cells each having an inductance coil coupled in a series circuit relationship with the output of said high voltage converting means.

4. A corona discharge generator system as defined in claim 3 wherein said high voltage converting means is a switching circuit containing a vacuum switch tube having an independently controlled grid.

55 may be eliminated. The corona cell 50 is typically constructed in the manner shown in FIG. 1. The circuit through the corona cell 50 is completed by conductor 51 which is connected to the gate lead 32.

In operation the device of FIG. 3 requires that the output of DC power supply 45 be switched at a desired frequency which is produced by the pulse generator 24, which in turn is powered by the DC power supply 25. Typically, the DC power supply 45 is adjusted to operate about 5000 to 30,000 volts DC. The positive output side of the DC power supply 45 is applied to the corona cell as shown through the inductance 53 which typically has a value of 1.0 to 10.0 microhenry. The positive side of the power supply 45 also appears as being applied to the gate lead 32 through the inductance 47 which has a value of 0.1 to 1.0 henry and through the resistance 48 which has a value of 100 to 100,000 ohms. it is noted that switching of the output of vacuum tube 27 by means of the grid 34 which is connected to the pulse generator 24 produces a narrow high frequency pulse to appear across the plates of the corona cell 50. Typically, the pulse generator 25 is operated at a frequency of from 0.1 to 100 KHz. Also, for vacuum switch tubes of appropriate design the grid 33 of the power tube 27 is maintained at a suitable potential from about +50 to +500 volts so that a bias voltage of about 10 to 5000 volts may be maintained across the plates of the corona cell 50. Other methods of supplying a low pulse to pulse bias are possible, as shown in FIG. 4. In this manner the operational parameters of the corona cell in terms of frequency, bias voltage, sparking voltage and pulse width may be conveniently selected within the limits indicated by the present invention. The circuit of FIG. 3 is classically called a hard tube modulator.

Another suitable type of power supply is shown in FIG. 4, wherein a triode type vacuum switch tube 60 includes a heated cathode 61, a plate 62 and a grid 63. This is a classical line pulser type modulator. The grid 63 is connected to a pulse generator 64 and a grounded conductor 65 which is also connected to the cathode 61. The cathode 61 is provided with heater leads 66 and 67 which are connected to a suitable source of power, not shown.

A high voltage DC power supply 70 is connected through its positive lead to the cathode lead 62 of the switch tube 60. The negative side of the DC power supply 70 is grounded. A DC bias voltage power supply 80 is negative grounded and the positive lead thereof is connected through an inductance 81 to conductor 82.

The DC power supplies 70 and 80 as well as the switch to circuit is connected to a conventional pulse forming network which is confined with the broken line 84 and includes selected inductances 85, 86 and 87 which are connected in series with each other through conductors 88, 89 and 90. Also included in the pulse forming network 85 are capacitances 91, 92 and 93 which are respectively connected to the conductors 88, 89 and 90 by means of conductors 94, 95 and 96. The pulse forming network 84 is connected to the DC power supply switch circuit by means of conductors 95 and 98. The output of the pulse forming network 84 is connected through to the primary side of a step-down transformer 100 by means of leads 101 and 102. The step-down transformer secondary is connected to a corona cell 105 by means of conductors 106 and 107. The step-down requirement is necessary at power levels greater than a few kilowatts. It is found to be impractical to build step-up pulse transformers with the required characteristics of band width, inductance, etc. at higher power levels. Step-down transformers are possible, however. The output of the bias power supply 80 is supplied to the corona cell 105 through the conductors 82 and 107.

In operation the system of FIG. 4 is adjusted so that the power supply 70 produces a voltage from about 10,000 to 100,000 volts DC which appears across the plate 62 of switch tube 60 and one side of pulse network 84. The DC power supply 80 is adjusted to provide a voltage of from about 10 to 10,000 volts DC which appears across the electrodes of corona cell 105. The pulse generator 64 is adjusted to provide a frequency output in the range of 0.1 to 200 KHz at a voltage of from about 100 to 10,000 v.

In the pulse forming network 84 the inductances 85, 86 and 87 are selected to have a value of from about 1.0 to 1000 microhenry, while the capacitances 91, 92 and 93 are selected to have a value of from about $10^{-6}$ to 1 microfarads. It is seen that by pulsing the pulse forming network from the switch tube circuit the output of the pulse forming network appears across the step-down transformer 100. Since the transformer 100 is of a step-down type, preferably the primary to secondary winding ratio will have a value of from about 1:2 to 1:100 and it is seen that the inductance characteristics of the power supply may be readily matched to those of the corona cell.

While for purpose if illustration the aforementioned systems of FIGS. 3 and 4 show the corona generator as a box and described as typically employing the corona or discharge cell of FIG. 1, it is found in many instances advantageous to series several individual corona cells of the type shown in FIG. 1 to provide the voltage drop and impedance characteristics required by the high frequency power supplies of FIGS. 3 and 4. A particularly advantageous combination of corona cells is set forth in FIG. 5. It is seen in FIG. 5 that a multiplicity of corona cells 110 which are schematically shown as gas filled capacitance devices are series parallel connected by means of electric leads 111 and 112 which are connected through inductance coils 114 and 115 to power input lead 116. The opposite side of series connected corona cells 110 are connected to electrode input lead 117. Typically, leads 116 and 117 are connected to the power output leads 51 and 52 of the system shown in FIG. 3 or the outlet leads 106 and 107 shown in FIG. 4, that is, the corona cell system of FIG. 5 may constitute the corona cell load 50 of the system of FIG. 3, and 105 the system of FIG. 4.

In the corona cell system of FIG. 5, the inductances 114 and 115 are selected so as to match the impedance of the series parallel connected corona cells with that of the output of the high frequency power supplies. Typically, inductance coils 114 and 115 will have a value of about from 1.0 to 100 microhenrys. While the system shown in FIG. 5 comprises two parallel connected corona cell banks, each bank consisting of three parallel connected lines of three series connected corona cells each, it is to be understood that the system may include as many parallel connected branches as desired. Furthermore, the number of series connected cells may be selected so as to provide the voltage drop required for the operation of any particular system.

It is found advantageous in the operation of many commercial systems to provide a means for series connecting the output of multiple corona cells in which the 5. A corona discharge generator system for multiple corona cells comprising:
- (a) power supply circuit means for generating a DC output voltage of at least 5 kv in magnitude, said power supply circuit means including means for converting said DC output into a series of narrow DC pulses at a pulse rate of between 0.1 to 100 KHz;
- (b) a pulse forming network connected to the output of said power supply circuit means said pulse forming network comprising a plurality of inductance coils connected in a series circuit relationship and a plurality of capacitors with each capacitor having one end thereof connected between a separate adjacent pair of said plurality of inductance coils and with the opposite end of each capacitor connected in common;
- (c) means for superimposing a bias potential across said multiple corona cells; and
- (d) a step down transformer having a primary and a secondary winding with the primary winding representing the output of said pulse forming network and with the secondary winding connected in a series circuit relationship with and representing an input inductance coil of at least one bank of corona discharge cells having at least two parallel branches with each branch containing at least two corona cells connected to each other in a series relationship.

* * * * *